(12) United States Patent
Tseng et al.

(10) Patent No.: US 11,294,685 B2
(45) Date of Patent: Apr. 5, 2022

(54) INSTRUCTION FUSION USING DEPENDENCE ANALYSIS

(71) Applicant: International Business Machines Corporation, Armonk, NY (US)

(72) Inventors: Jessica Hui-Chun Tseng, Freemont, CA (US); Manoj Kumar, Yorktown Heights, NY (US); Kattamuri Ekanadham, Mohegan Lake, NY (US); Jose E. Moreira, Irvington, NY (US); Pratap C. Pattnaik, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/431,723

(22) Filed: Jun. 4, 2019

(65) Prior Publication Data

US 2020/0387377 A1 Dec. 10, 2020

(51) Int. Cl.
*G06F 9/38* (2018.01)
*G06F 8/41* (2018.01)

(52) U.S. Cl.
CPC .......... *G06F 9/3853* (2013.01); *G06F 9/3838* (2013.01); *G06F 8/433* (2013.01)

(58) Field of Classification Search
CPC .... G06F 9/3838; G06F 9/3853; G06F 9/3812; G06F 9/30152; G06F 8/433; G06F 8/4451; G06F 8/445
See application file for complete search history.

(56) References Cited

U.S. PATENT DOCUMENTS

| | | | |
|---|---|---|---|
| 5,572,590 A | 11/1996 | Chess | |
| 5,572,595 A | 11/1996 | Kumagai et al. | |
| 6,311,179 B1* | 10/2001 | Agarwal | G06F 16/2465 |
| 6,988,183 B1* | 1/2006 | Wong | G06F 9/30174 |
| | | | 712/208 |
| 9,015,690 B2 | 4/2015 | Ye et al. | |
| 9,239,712 B2 | 1/2016 | Rong et al. | |
| 9,329,848 B2 | 5/2016 | Lupon et al. | |
| 9,639,336 B2* | 5/2017 | Grover | G06F 8/443 |
| 2002/0013937 A1* | 1/2002 | Ostanevich | G06F 8/4441 |
| | | | 717/160 |

(Continued)

OTHER PUBLICATIONS

Shiliang Hu and James E. Smith, "Using Dynamic Binary Translation to Fuse Dependent Instructions", March, IEEE, pp. 1-12 (Year: 2004).*

(Continued)

*Primary Examiner* — Courtney P Carmichael-Moody
(74) *Attorney, Agent, or Firm* — Daniel Morris; Otterstedt, Wallace & Kammer, LLP (57) ABSTRACT

Method and systems for creating a sequence of fused instructions. An instruction stream is obtained, and a window of instructions from the instruction stream is examined and one or more groups of instructions that satisfy one or more fusion rules are identified. One or more of the groups of instructions that satisfy the one or more fusion rules are fused and a maximal length data dependence chain in the instruction stream is analyzed by analyzing every node in a dependence graph in a selected window of instructions. Fusion of an instruction group is prevented based on the maximal length data dependence chain.

20 Claims, 9 Drawing Sheets

(56) References Cited

U.S. PATENT DOCUMENTS

| | | | |
|---|---|---|---|
| 2007/0038844 A1* | 2/2007 | Valentine | G06F 9/3863 |
| | | | 712/219 |
| 2009/0031120 A1* | 1/2009 | Vaden | G06F 9/3001 |
| | | | 712/226 |
| 2015/0026671 A1* | 1/2015 | Lupon | G06F 8/4434 |
| | | | 717/153 |
| 2015/0220315 A1* | 8/2015 | Chiba | G06F 8/40 |
| | | | 717/149 |
| 2018/0095752 A1* | 4/2018 | Kudaravalli | G06F 9/382 |

OTHER PUBLICATIONS

Anonymous, IP.com No. IPCOM000010816D, Electronic Publication Date: Jan. 23, 2003, Straight-Path Search, 13 pages.

Anonymous, IP.com No. IPCOM000021065D, Electronic Publication Date: Dec. 19, 2003, Method of Preserving High-level Dependence Analysis for Low-level Compiler Optimizations, 4 pages.

Anonymous, IP.com No. IPCOM000223340D, Electronic Publication Date: Nov. 19, 2012, Method and System for Predicting Performance Trade-Offs During Critical Path Execution in a Processor, 7 pages.

Kristensen, et al. "Fusion of array operations at runtime." arXiv preprint arXiv:1601.05400 (2016), 13 pages.

Sewall, et al., "High-Performance Code Generation though Fusion and Vectorization." arXiv preprint arXiv:1710.08774 (2017), 14 pages.

Peter Mell and Timothy Grance, The NIST Definition of Cloud Computing, NIST Special Publication 800-145, Sep. 2011, cover, pp. i-iii and 1-3.

\* cited by examiner

INSTRUCTION FUSION USING DEPENDENCE ANALYSIS

BACKGROUND

The present invention relates to the electrical, electronic and computer arts, and more specifically, to increasing the performance of central processing units and the like.

Computer processors increase runtime efficiency by fusing inflight instructions that are to be executed together as a group. In conventional implementations, fusion groups are greedily formed by fusing two instructions that reside in an instruction window, where the fused instructions can be executed as one internal operation by the computer hardware. This technique may not necessarily result in improved computer performance since the critical path of execution may be increased (instead of decreased).

SUMMARY

Principles of the invention provide techniques for improved instruction fusion using dependence analysis. In one aspect, an exemplary method includes the step of obtaining an instruction stream; examining a window of instructions from the instruction stream and identifying one or more groups of instructions that satisfy one or more fusion rules; fusing one or more of the groups of instructions that satisfy the one or more fusion rules; analyzing a maximal length data dependence chain in the instruction stream by analyzing every node in a dependence graph in a selected window of instructions; and preventing fusion of an instruction group based on the maximal length data dependence chain.

In one aspect, a non-transitory computer readable medium comprises computer executable instructions which when executed by a computer cause the computer to perform a method comprising operations of: obtaining an instruction stream; examining a window of instructions from the instruction stream and identifying one or more groups of instructions that satisfy one or more fusion rules; fusing one or more of the groups of instructions that satisfy the one or more fusion rules; analyzing a maximal length data dependence chain in the instruction stream by analyzing every node in a dependence graph in a selected window of instructions; and preventing fusion of an instruction group based on the maximal length data dependence chain.

In one aspect, an apparatus comprises a memory; and at least one processor, coupled to said memory, and operative to perform operations comprising: obtaining an instruction stream; examining a window of instructions from the instruction stream and identifying one or more groups of instructions that satisfy one or more fusion rules; fusing one or more of the groups of instructions that satisfy the one or more fusion rules; analyzing a maximal length data dependence chain in the instruction stream by analyzing every node in a dependence graph in a selected window of instructions; and preventing fusion of an instruction group based on the maximal length data dependence chain.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments provide one or more of:

efficient fusion of instructions;

reduction of program execution time and an increase in utilization of processor resources and capacity; and avoidance of instruction fusion where the critical path of execution is increased.

These and other features and advantages of the present invention will become apparent from the following detailed description of illustrative embodiments thereof, which is to be read in connection with the accompanying drawings.

DETAILED DESCRIPTION

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
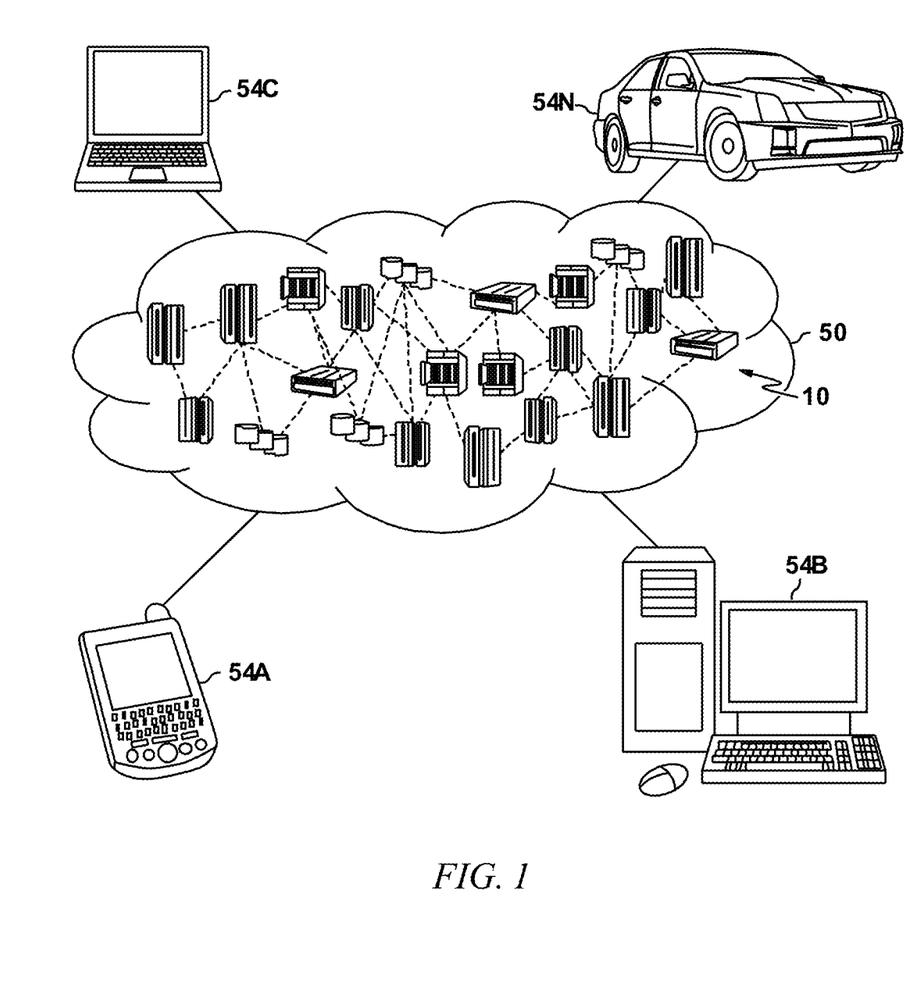
FIG. 1 depicts a cloud computing environment according to an embodiment of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
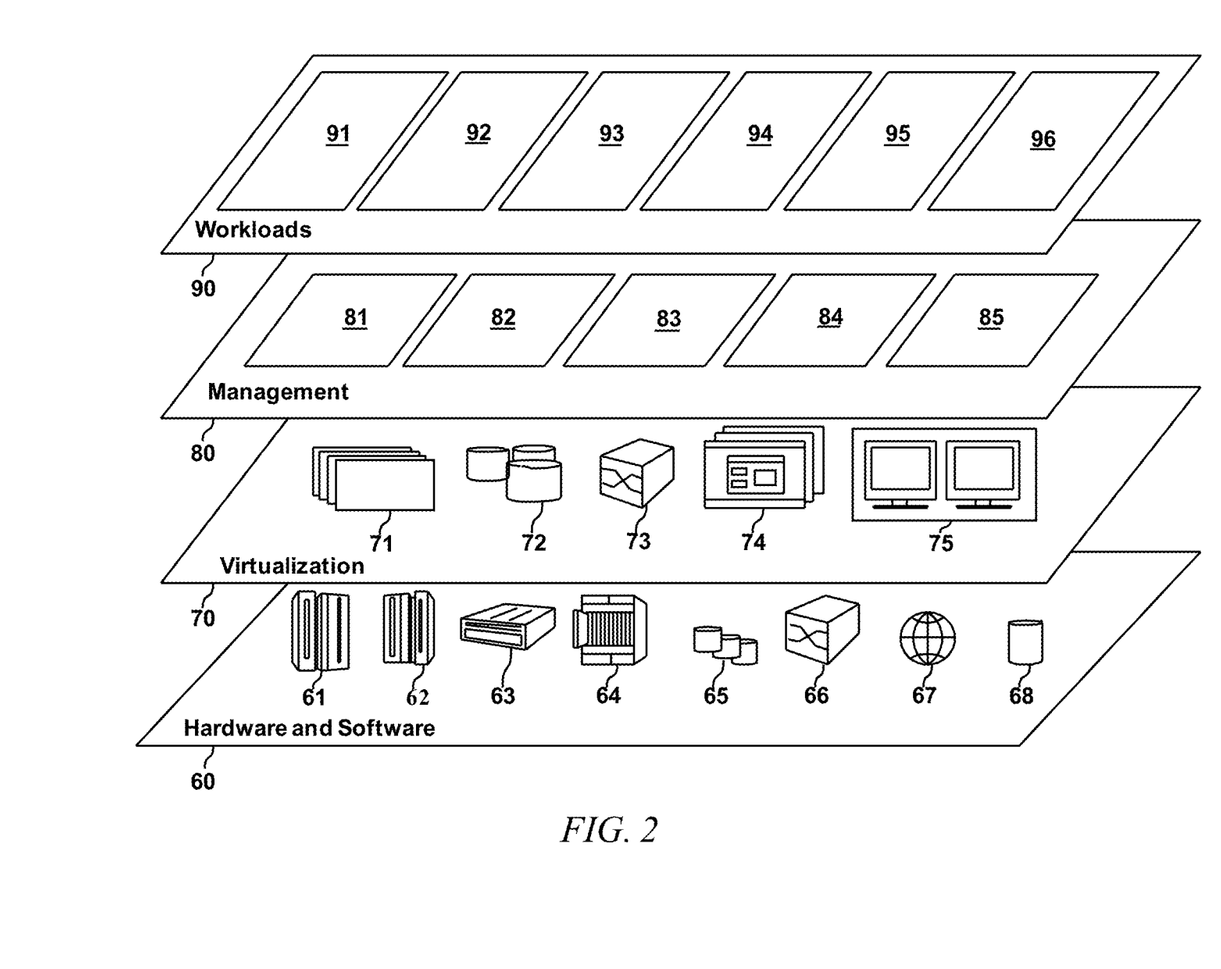
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95, and mobile desktop 96. In one or more embodiments, instruction fusion in accordance with aspects of the invention is implemented in the processors 61 to 64 in hardware and software layer 60 in FIG. 2, to improve the performance of the aforementioned exemplary applications in layer 90.

Figure 3A:
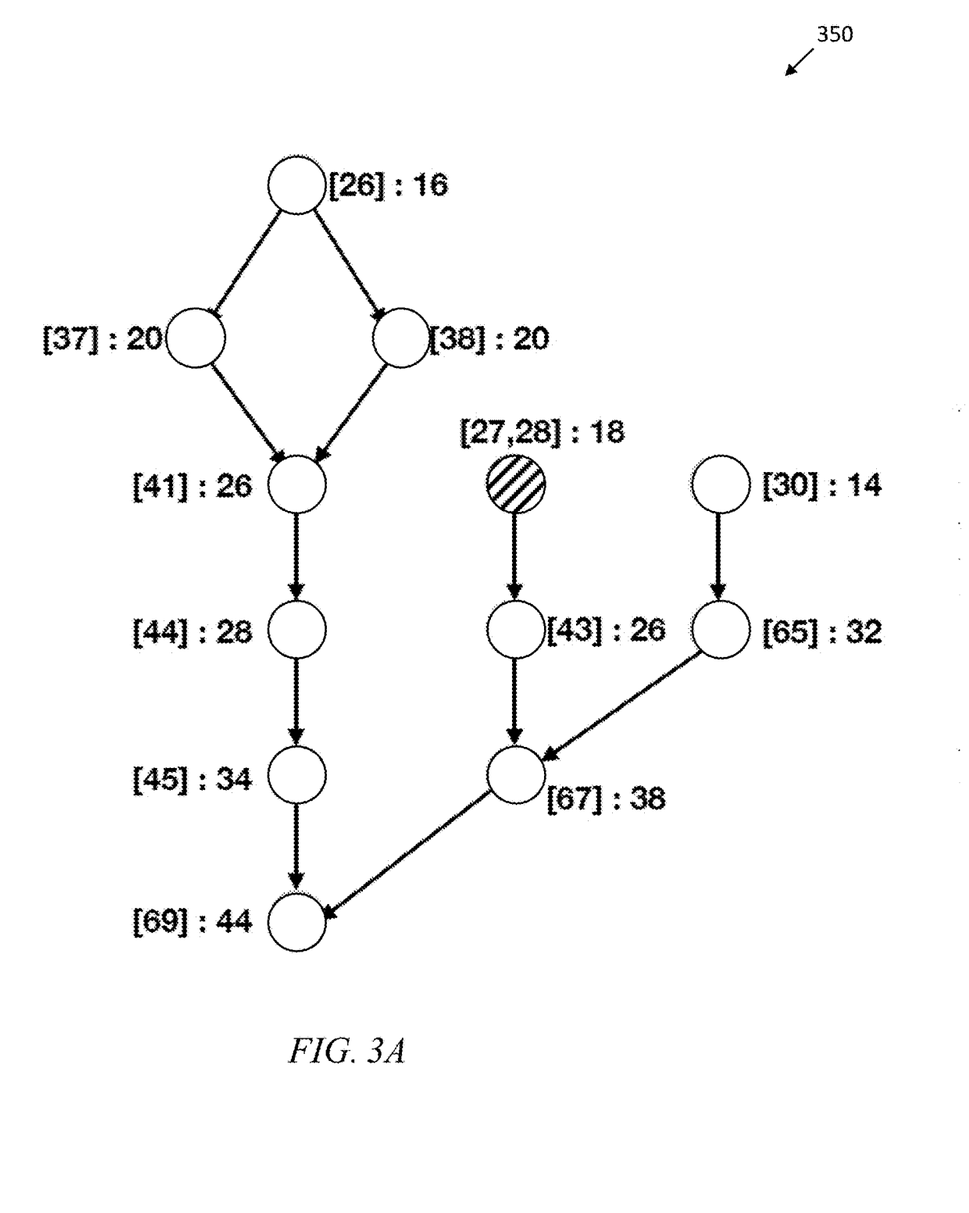
FIG. 3A illustrates an example dependence graph for instruction fusion, in accordance with an example embodiment.

Generally, method(s) and/or system(s) are provided for using dependence analysis to prevent a fusion of instructions where the critical path of execution is increased by the fusion. FIG. 3A illustrates an example dependence graph 350 for instruction fusion, in accordance with an example embodiment. The dependence graph 350 shows nodes representing instructions 26 through 69, as indicated by the numbers in square brackets. The number after the colon is the corresponding cycle number at which the instruction group completes in the schedule. As illustrated in the example dependence graph 350 of FIG. 3A, unfilled nodes are single (unfused) instructions and node(s) with section lining are fused instructions. Only the pair of instructions [27, 28] are fused and the whole segment completes by cycle 44.

In one example embodiment, an example heuristic provides for analyzing the maximal length data dependence chain in the instruction stream by analyzing every node within a selected window of instructions. The length is based on the sum of the dependence arc, appropriately weighted. In one example embodiment, a policy to assign weights to arcs is to make the weight equal to the instruction runtime latency of the source instruction. The technique may be used offline or inflight.

For example, let H(x) denote the maximal length in a dependence graph leading to instruction x. Let T(x) denote the maximal length originating from instruction x. If (H(x)<H(y)) and (T(x)>T(y)), do not fuse instruction pair (x, y).

T(x), the longest path starting from instruction x, is computed as follows:
1. Conduct a breadth first traversal on the dependence graph with instruction x as the root node.
2. Label each node in the dependence graph with the distance from the root node.
3. At the end of the traversal, return the maximum distance encountered among all reachable nodes in the dependence graph.

H(x), the longest path ending in instruction x, is computed as follows:
1. Invert all edges of the acyclic dependence graph.
2. Conduct a breadth first traversal with instruction x as the root node.
3. Label each node in the acyclic dependence graph with the distance from the root node.
4. At the end of the traversal, return the maximum distance encountered among all reachable nodes in the acyclic dependence graph.

Instruction Fusion Architecture

Figure 3B:
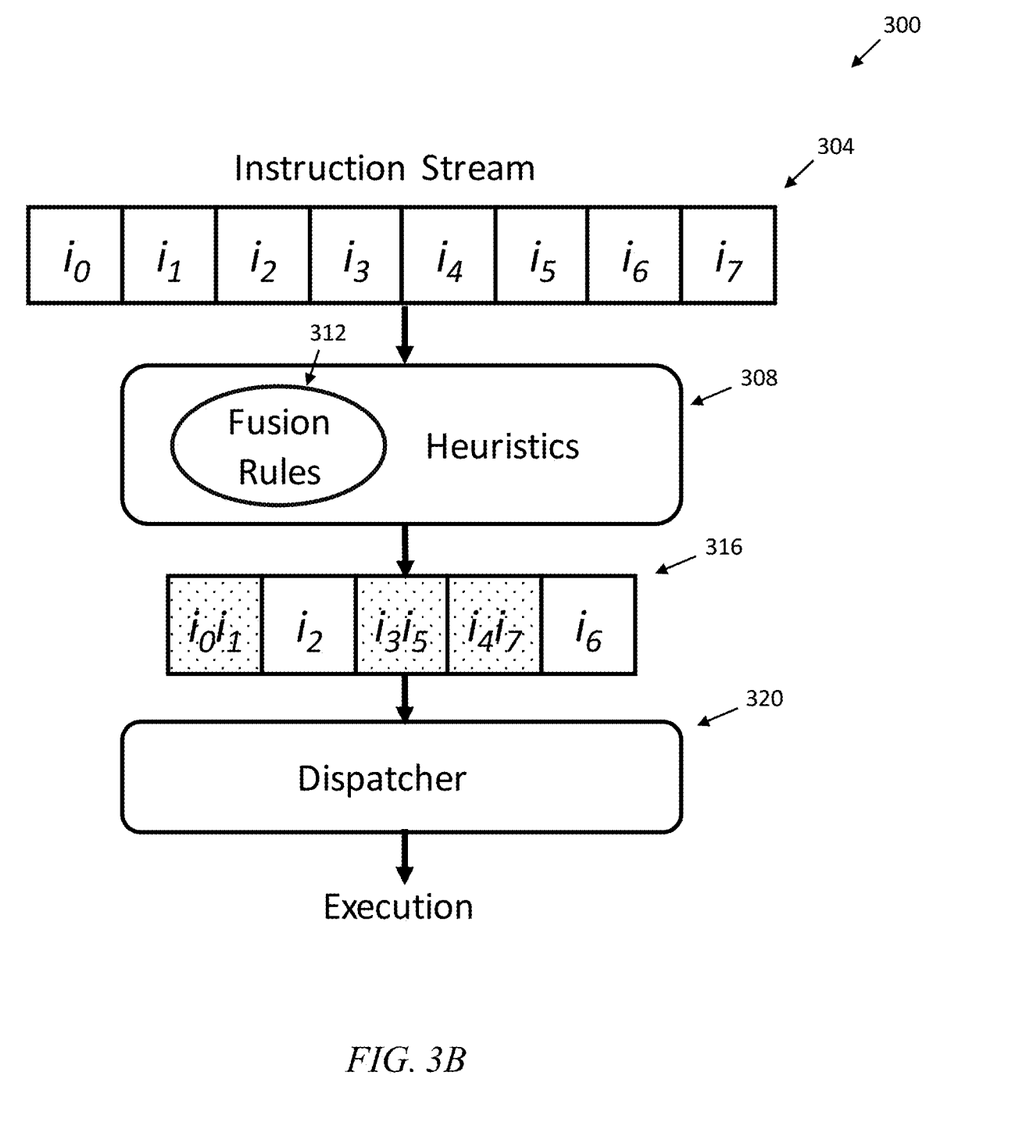
FIG. 3B illustrates an example workflow for instruction fusion, in accordance with an example embodiment.

FIG. 3B illustrates an example workflow 300 for instruction fusion, in accordance with an example embodiment. An instruction stream 304 that includes instructions $i_0$ through $i_7$ is processed using the fusion rules 312 of fusion heuristics 308, as described above. Given a sequence of instructions (such as instruction stream 304), the heuristic algorithm of the fusion heuristics 308 examines a window of instructions from the sequence (instruction stream 304), and identifies groups of instructions that satisfy the fusion rules 312, such as the rules given above. The fusion heuristics 308 further identify a subset of such groups that are mutually disjoint (each instruction is fused at most only once). Each fusion rule specifies the opcodes of instructions and the conditions (in terms of the input/output register count and interdependence of registers within a group) of instructions that may be fused together, as described more fully below in the techniques for offline and inflight dependence graph analysis. Based on the fusion rules 312, instructions $i_0$ and $i_1$ are fused, instructions $i_3$ and $i_5$ are fused, and instructions $i_4$ and $i_7$ are fused, generating fused instruction stream 316. A dispatcher 320 is supplied with the above fusion groups (fused instruction stream 316) and dispatches each group for execution as if they were single instructions. The back end of the processor then efficiently executes the fused groups, as designed.

Figure 4:
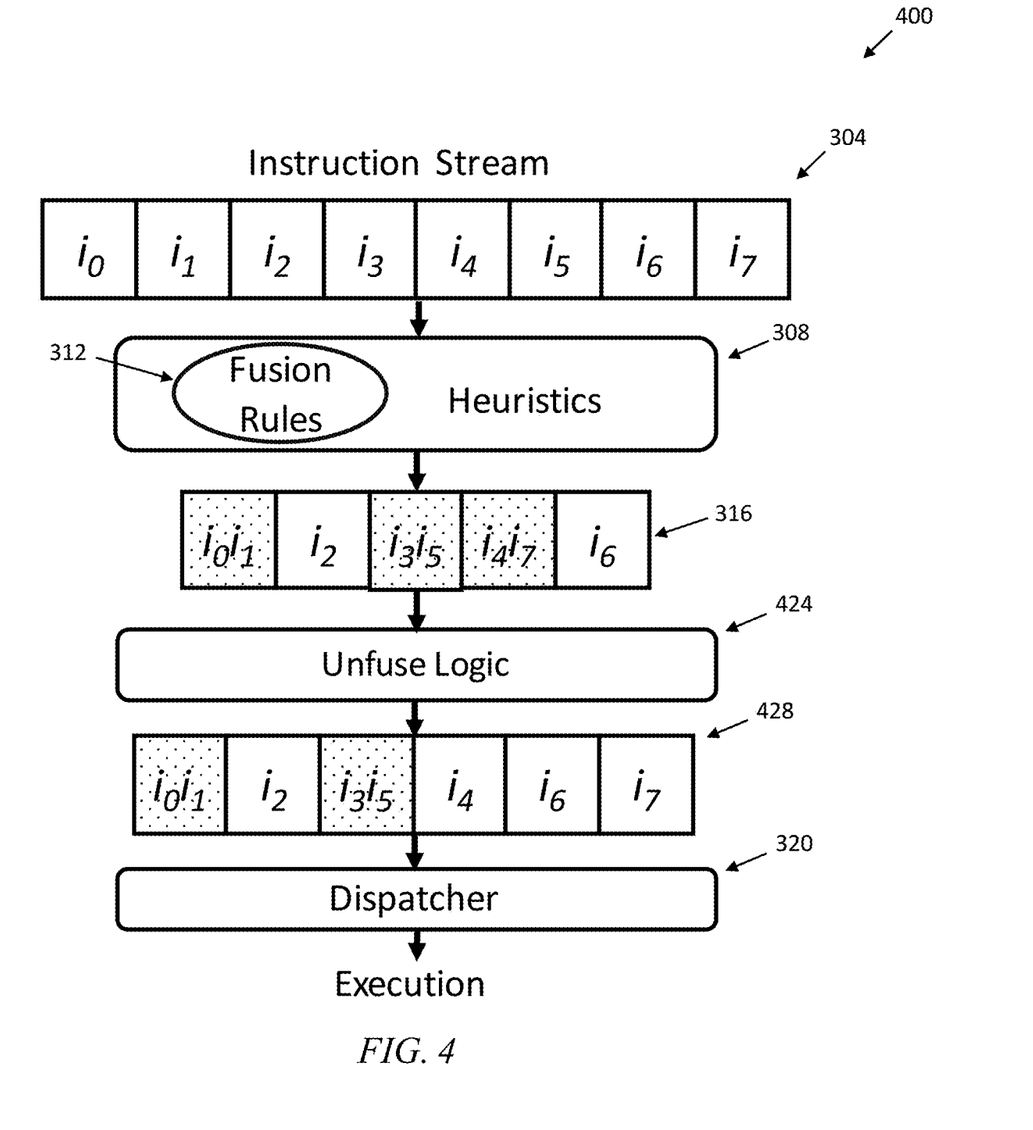
FIG. 4 illustrates an example workflow for instruction fusion incorporating unfuse logic, in accordance with an example embodiment.

FIG. 4 illustrates an example workflow 400 for instruction fusion incorporating unfuse logic 424, in accordance with an example embodiment. Workflow 400 is similar to the workflow 300, with the addition of unfuse logic 424. Unfuse logic 424 unfuses fused instruction groups, where such unfusing would shorten the execution time of a window of instructions, to produce instruction stream 428. (Unfused instructions are formatted and executed as individual instructions.) In some cases, the instructions are prevented from initially being fused, as opposed to unfusing fused instructions.

Offline Dependence Graph Analysis

Figure 5:
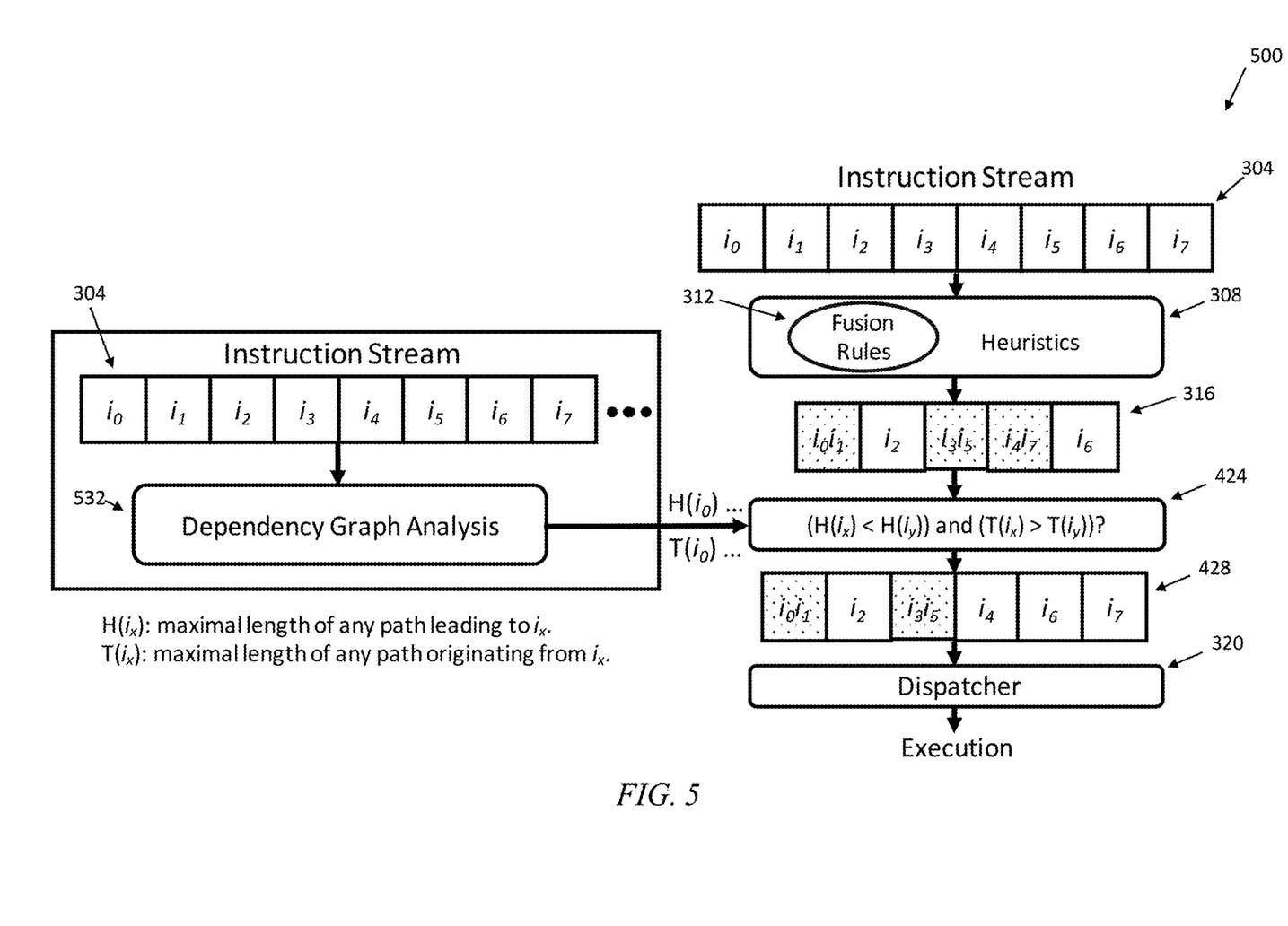
FIG. 5 illustrates offline dependence graph analysis for the example workflow, in accordance with an example embodiment.

FIG. 5 illustrates offline dependence graph analysis for the example workflow 500, in accordance with an example embodiment. The offline dependence graph analysis 532 is performed off-line and the resulting instruction stream 428 is forwarded to the processor. The offline dependence graph analysis 532 is performed on the instruction stream 304 to determine:

$H(i_x)$: the maximal length of any path leading to instruction $i_x$.

$T(i_x)$: the maximal length of any path originating from instruction $i_x$.

If (H(x)<H(y)) and (T(x)>T(y)), the instruction pair (x, y) is not fused, or is unfused if in a fused state.

Inflight Dependence Graph Analysis

Figure 6:
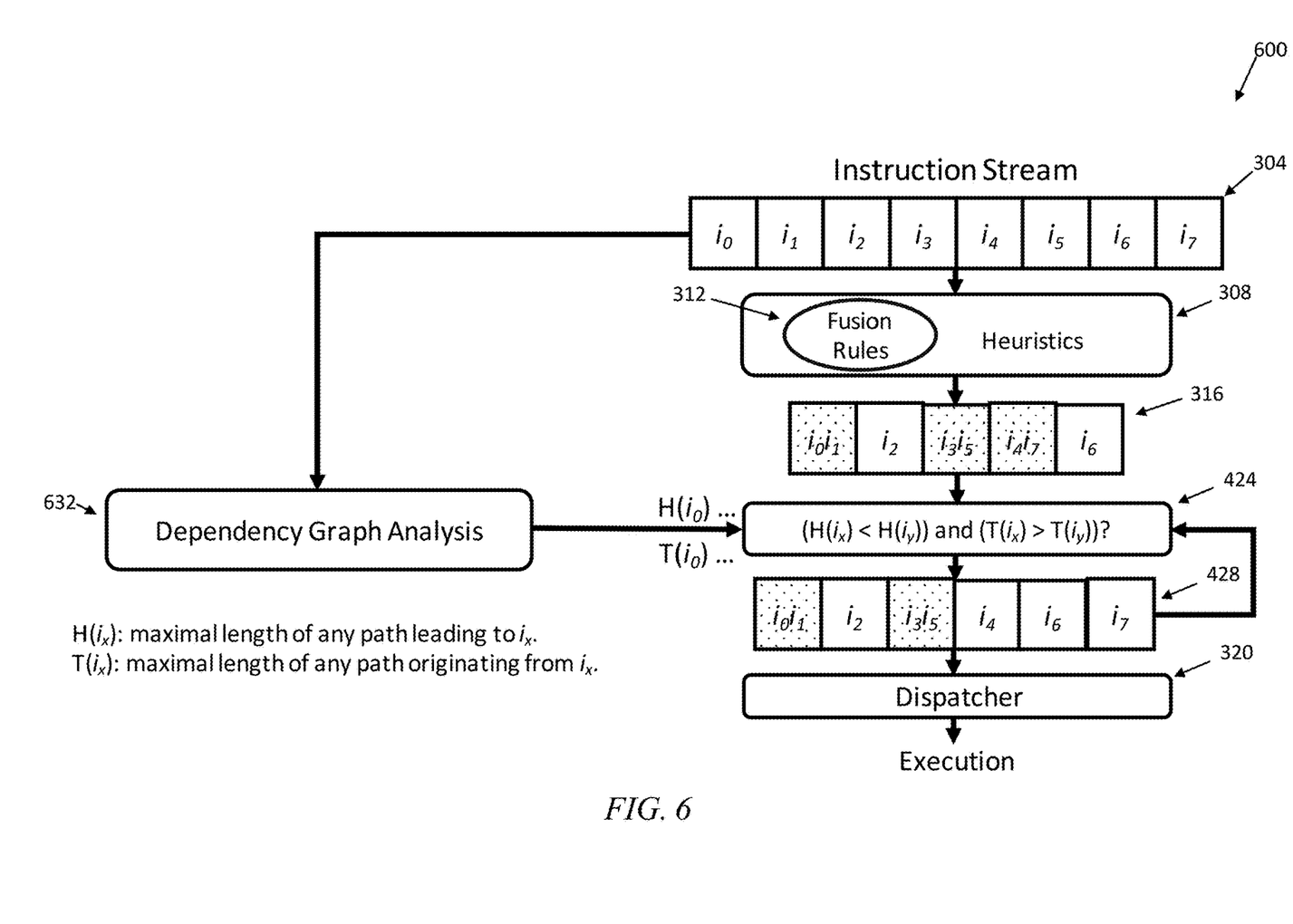
FIG. 6 illustrates inflight dependence graph analysis for the example workflow, in accordance with an example embodiment.

FIG. 6 illustrates inflight dependence graph analysis for the example workflow 600, in accordance with an example embodiment. The inflight dependence graph analysis 632 is an approximation because the processor can only observe the already fetched instruction stream 304. As new instructions are fetched, $T(i_x)$ is updated. The inflight dependence graph analysis 628 is performed on the instruction stream 304 to determine:

$H(i_x)$: the maximal length of any path leading to instruction $i_x$.
$H(i_x)$ is determined by tracking the path length between the instructions that produce each source register of instruction $i_x$. ($H(i_x)$=maximum(pathlength($src_0$), pathlength($src_1$), pathlength($src_2$), . . . ))

$T(i_x)$: the maximal length of any path originating from instruction $i_x$. $T(i_x)$ is approximated inflight as not all the dependent instructions have been fetched together (prior to the computation of $T(i_x)$). In one example embodiment, the dependence graph analysis is performed in the same manner for both the offline and inflight implementations, but using different window sizes. If the determination of instructions pairs to be used is done at run time, the window size is typically two to sixteen instructions, the window size being limited by hardware resource constraints. If the determination of instructions pairs to be used is done offline, the window sizes will be limited by the length of function bodies.

Figure 7:
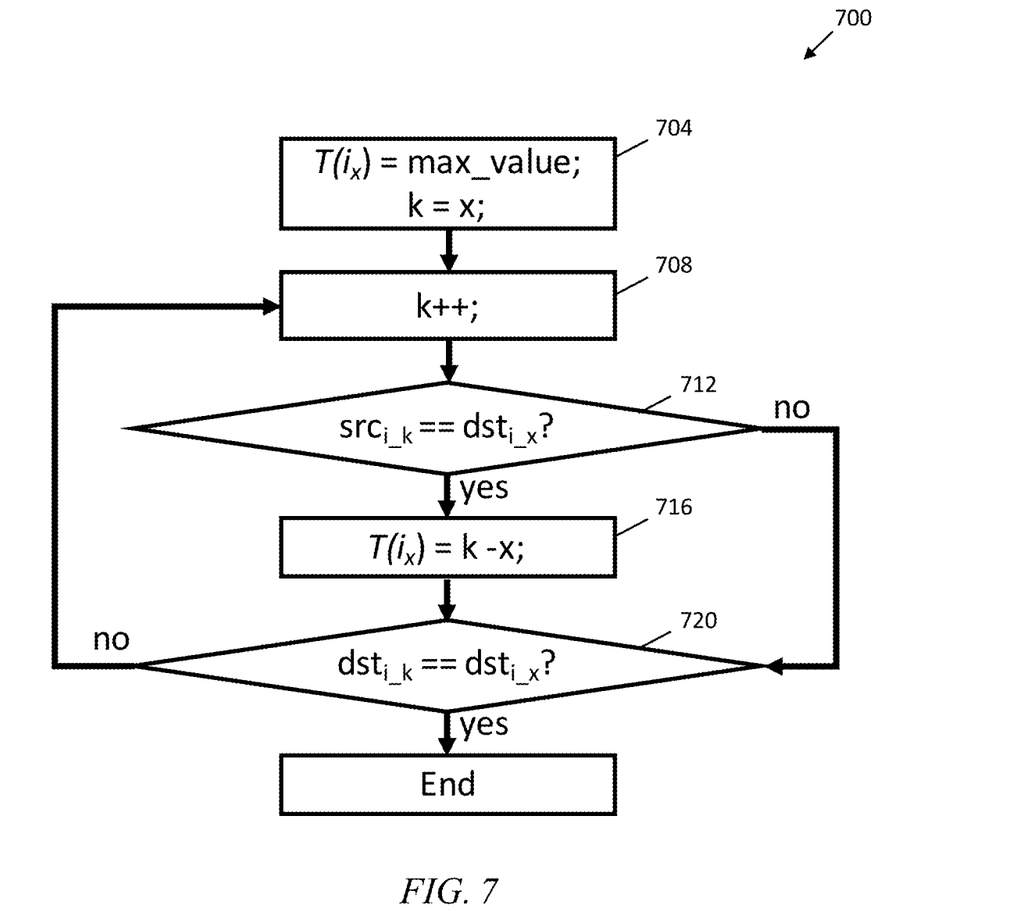
FIG. 7 is a flowchart for an example $T(i_x)$ counter, in accordance with an example embodiment.

FIG. 7 is a flowchart for an example $T(i_x)$ counter 700, in accordance with an example embodiment. In one example embodiment, $T(i_x)$ is set to max_value and k is set to x (operation 704) and k is incremented (operation 708). A check is performed to determine if $src_{i\_k}$ equals $dst_{i\_x}$ (operation 712). If $src_{i\_k}$ does not equal $dst_{i\_x}$ (NO branch of decision block 712), the method 700 proceeds with operation 720; otherwise (YES branch of decision block 712), $T(i_x)$ is set to k-x (operation 716) and the method 700 proceeds with operation 720.

During operation 720, a check is performed to determine if $dst_{i\_k}$ equals $dst_{i\_x}$. If $dst_{i\_k}$ does not equal $dst_{i\_x}$ (NO branch of decision block 720), the method 700 proceeds with operation 708; otherwise (YES branch of decision block 720), the method 700 ends. In one example embodiment, H(&) is similarly determined by traversing the dependence graph using the same operations as method 700 after reversing the dependence arcs.

In one example embodiment, in a processor capable of executing a group of instructions as a single operation (fusion capability), permissible per fusion rules, a method creates a sequence of fused instructions consisting of enumerating all the permissible fusion groups in a window of instructions; and selects a disjoint subset of fusion groups to minimize the execution time for a window of instructions based on a timing model.

In one example embodiment, in a processor capable of executing a group of instructions as a single operation (fusion capability), permissible per fusion rules, a method creates a sequence of fused instructions consisting of enumerating all the permissible fusion groups in a window of instructions; selecting a disjoint subset of fusion groups to minimize the execution time for a window of instructions based on a timing model; and preventing some groups from fusing if a dependence graph analysis on a window of instructions reveals that not fusing one or more of these fusion groups results in improvements in execution time.

In one example embodiment, the dependence graph analysis comprises conducting the following test for each instruction pair in a selected fusion group: letting H(x) and T(x) denote the maximal length leading to and originating from instruction x, in an instruction window, respectively, and if (H(x)<H(y)) and (T(x)>T(y)), instruction pair (x, y) is not fused.

In one example embodiment, the formation of fusion groups and decisions to not fuse are both done by a compiler. In one example embodiment, the formation of fusion groups and decisions to not fuse are both done in the same stage of the execution pipeline, for example, both in a front-end (when instructions are decoded, prior to execution) or both in a back-end (post decode and dispatch, and prior to issue). In one example embodiment, a decision to not fuse is carried out in a back-end, factoring in runtime information from the processor, such as cache misses. In one example embodiment, a decision to not fuse is carried out in the compiler, to prevent formation of certain fusion groups in the processor.

Given the discussion thus far, it will be appreciated that, in general terms, an exemplary method, according to an aspect of the invention, includes the steps of obtaining an instruction stream 304; examining a window of instructions from the instruction stream (308, 532) and identifying one or more groups of instructions that satisfy one or more fusion rules 312; fusing one or more of the groups of instructions that satisfy the one or more fusion rules; analyzing a maximal length data dependence chain in the instruction stream by analyzing every node in a dependence graph 350 in a selected window of instructions; and preventing fusion of an instruction group based on the maximal length data dependence chain (424).

In one aspect, a non-transitory computer readable medium comprises computer executable instructions which when executed by a computer cause the computer to perform a method comprising operations of: obtaining an instruction stream 304; examining a window of instructions from the instruction stream (308, 532) and identifying one or more groups of instructions that satisfy one or more fusion rules 312; fusing one or more of the groups of instructions that satisfy the one or more fusion rules; analyzing a maximal length data dependence chain in the instruction stream by analyzing every node in a dependence graph 350 in a selected window of instructions; and preventing fusion of an instruction group based on the maximal length data dependence chain (424).

In one aspect, an apparatus comprises a memory; and at least one processor, coupled to said memory, and operative to perform operations comprising: obtaining an instruction stream 304; examining a window of instructions from the instruction stream (308, 532) and identifying one or more groups of instructions that satisfy one or more fusion rules 312; fusing one or more of the groups of instructions that satisfy the one or more fusion rules; analyzing a maximal length data dependence chain in the instruction stream by analyzing every node in a dependence graph 350 in a selected window of instructions; and preventing fusion of an instruction group based on the maximal length data dependence chain (424).

In one example embodiment, each fused group is dispatched (320) for execution as if each fused group were a single instruction. In one example embodiment, each fused group is executed. In one example embodiment, H(x) is a maximal length leading to instruction x in a corresponding instruction window and T(x) is a maximal length originating from the instruction x in the instruction window, and the fusion is prevented if (H(x)<H(y)) and (T(x)>T(y)) for a pair of instructions x, y. In one example embodiment, the analyzing further comprises computing T(x) by conducting a breadth first traversal on the dependence graph for the instruction stream with instruction x as a root node, labeling each node in the dependence graph with a distance from the root node, and returning a maximum distance encountered among all reachable nodes in the dependence graph. In one example embodiment, the analyzing further comprises computing H(x) by inverting all edges of an acyclic dependence graph for the instruction stream, conducting a breadth first traversal with instruction x as a root node, labeling each node in the acyclic dependence graph with a distance from the root node, and returning a maximum distance encountered among all reachable nodes in the acyclic dependence graph at an end of the breadth first traversal.

In one example embodiment, the method for creating a sequence of fused instructions is performed by a compiler or other offline tool. In one example embodiment, a formation of a fusion group and a decision to prevent fusion are done at runtime. In one example embodiment, the fusion takes place in a decode stage prior to execution of a given instruction. In one example embodiment, the decision to prevent fusion is carried out by factoring in runtime information from a processor. In one example embodiment, the decision to prevent fusion is carried out offline to prevent formation of certain fusion groups. In one example embodiment, fusion of a group is prevented in response to the dependence graph analysis 532 on the window of instruction revealing that not fusing the group results in an improvement in execution time.

In one example embodiment, a counter value $T(i_x)$ for an instruction $i_x$ is determined, the determining further comprising: setting $T(i_x)$ to max_value (operation 704); setting index k to x (operation 704); incrementing the index k (operation 708); and performing a check to determine if source $src_{i\_k}$ equals destination $dst_{i\_x}$ (operation 712). In one example embodiment, the determining further comprises setting the counter value $T(i_x)$ to k-x (operation 716) in response to source $src_{i\_k}$ equaling destination $dst_{i\_x}$. In one example embodiment, the determining further comprises performing a check to determine if destination $dst_{i\_k}$ equals destination $dst_{i\_x}$ (operation 720) and repeating the incrementing operation in response to destination $dst_{i\_k}$ not equaling destination $dst_{i\_x}$.

Figure 8:
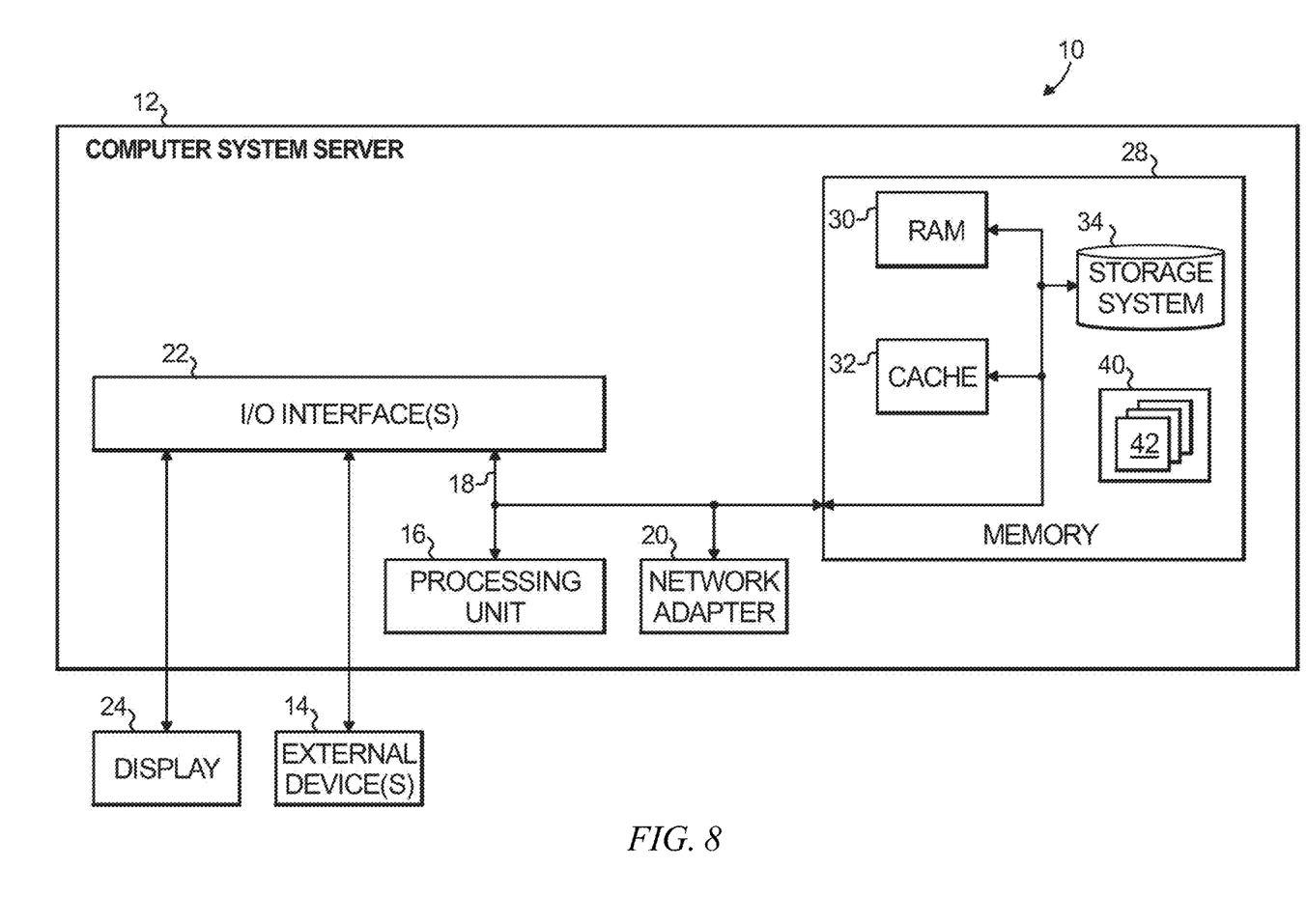
FIG. 8 depicts a computer system that may be useful in implementing one or more aspects and/or elements of the invention, also representative of a cloud computing node according to an embodiment of the present invention.

One or more embodiments of the invention, or elements thereof, can be implemented in the form of an apparatus including a memory and at least one processor that is coupled to the memory and operative to perform exemplary method steps. FIG. 8 depicts a computer system that may be useful in implementing one or more aspects and/or elements of the invention, also representative of a cloud computing node according to an embodiment of the present invention. Referring now to FIG. 8, cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 8, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 8) running a server program. It will be understood that such a physical server may or may not include a display and keyboard.

One or more embodiments can be at least partially implemented in the context of a cloud or virtual machine environment, although this is exemplary and non-limiting. Reference is made back to FIGS. 1-2 and accompanying text.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

Exemplary System and Article of Manufacture Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for creating a sequence of fused instructions comprising:
    obtaining an instruction stream;
    examining a window of instructions from the instruction stream and identifying one or more groups of instructions that satisfy one or more fusion rules;
    fusing one or more of the groups of instructions that satisfy the one or more fusion rules;
    analyzing a maximal length data dependence chain in the instruction stream by analyzing every node in a dependence graph in a selected window of instructions, wherein a length of the maximal length data dependence chain is based on a sum of a weighted dependence arc and wherein each weight is equal to an instruction runtime latency of a source instruction; and
    preventing fusion of an instruction group based on the maximal length data dependence chain, wherein the fusion is prevented if a maximal length leading to an instruction x is less than a maximal length leading to an instruction y in a corresponding instruction window and a maximal length originating from the instruction x in the corresponding instruction window is greater than a maximal length originating from the instruction y in the corresponding instruction window for a pair of instructions x, y.

2. The method of claim 1, further comprising dispatching each fused group for execution as if each fused group were a single instruction.

3. The method of claim 1, further comprising executing each fused group.

4. The method of claim 1, wherein the method is performed by a compiler or other offline tool.

5. The method of claim 1, wherein a formation of a fusion group and a decision to prevent fusion are done at runtime.

6. The method of claim 5, wherein the fusion takes place in a decode stage prior to execution of a given instruction.

7. The method of claim 6, wherein the decision to prevent fusion is carried out by factoring in runtime information from a processor.

8. The method of claim 1, wherein a decision to prevent fusion is carried out offline to prevent formation of certain fusion groups.

9. The method of claim 1, further comprising preventing fusion of a group in response to the dependence graph analysis on the selected window of instructions revealing that not fusing the group results in an improvement in execution time.

10. A method for creating a sequence of fused instructions comprising:
    obtaining an instruction stream;
    examining a window of instructions from the instruction stream and identifying one or more groups of instructions that satisfy one or more fusion rules;
    fusing one or more of the groups of instructions that satisfy the one or more fusion rules;
    analyzing a maximal length data dependence chain in the instruction stream by analyzing every node in a dependence graph in a selected window of instructions; and
    preventing fusion of an instruction group based on the maximal length data dependence chain,
    where H(x) is a maximal length leading to instruction x in a corresponding instruction window, H(y) is a maximal length leading to instruction y in the corresponding instruction window, T(x) is a maximal length originating from the instruction x in the corresponding instruction window, T(y) is a maximal length originating from the instruction y in the corresponding instruction window, and where the fusion is prevented if (H(x)<H(y)) and (T(x)>T(y)) for a pair of instructions x, y.

11. The method of claim 10, wherein the analyzing further comprises computing T(x) by conducting a breadth first traversal on the dependence graph for the instruction stream with instruction x as a root node, labeling each node in the dependence graph with a distance from the root node, and returning a maximum distance encountered among all reachable nodes in the dependence graph.

12. The method of claim 10, wherein the analyzing further comprises computing H(x) by inverting all edges of an acyclic dependence graph for the instruction stream, conducting a breadth first traversal with instruction x as a root node, labeling each node in the acyclic dependence graph with a distance from the root node, and returning a maximum distance encountered among all reachable nodes in the acyclic dependence graph at an end of the breadth first traversal.

13. A method for creating a sequence of fused instructions comprising:
    obtaining an instruction stream;
    examining a window of instructions from the instruction stream and identifying one or more groups of instructions that satisfy one or more fusion rules;
    fusing one or more of the groups of instructions that satisfy the one or more fusion rules;
    analyzing a maximal length data dependence chain in the instruction stream by analyzing every node in a dependence graph in a selected window of instructions;
    preventing fusion of an instruction group based on the maximal length data dependence chain; and
    determining a counter value $T(i_x)$ for an instruction $i_x$, the determining further comprising:
    setting $T(i_x)$ to max_value;
    setting index k to x;
    incrementing the index k; and
    performing a check to determine if source $src_{i\_k}$ equals destination $dst_{i\_x}$.

14. The method of claim 13, wherein the determining further comprises setting the counter value $T(i_x)$ to k-x in response to source $src_{i\_k}$ equaling destination $dst_{i\_x}$.

15. The method of claim 13, wherein the determining further comprises performing a check to determine if destination $dst_{i\_k}$ equals destination $dst_{i\_x}$ and repeating the incrementing operation in response to destination $dst_{i\_k}$ not equaling destination $dst_{i\_x}$.

16. A non-transitory computer readable medium comprising computer executable instructions which when executed by a computer cause the computer to perform a method comprising operations of:
    obtaining an instruction stream;
    examining a window of instructions from the instruction stream and identifying one or more groups of instructions that satisfy one or more fusion rules;
    fusing one or more of the groups of instructions that satisfy the one or more fusion rules;
    analyzing a maximal length data dependence chain in the instruction stream by analyzing every node in a dependence graph in a selected window of instructions, wherein a length of the maximal length data dependence chain is based on a sum of a weighted dependence arc and wherein each weight is equal to an instruction runtime latency of a source instruction; and
    preventing fusion of an instruction group based on the maximal length data dependence chain, wherein the fusion is prevented if a maximal length leading to an instruction x is less than a maximal length leading to an instruction y in a corresponding instruction window and a maximal length originating from the instruction x in the corresponding instruction window is greater than a maximal length originating from the instruction y in the corresponding instruction window for a pair of instructions x, y.

17. An apparatus comprising:
    a memory; and
    at least one processor, coupled to said memory, and operative to perform operations comprising:
    obtaining an instruction stream;
    examining a window of instructions from the instruction stream and identifying one or more groups of instructions that satisfy one or more fusion rules;
    fusing one or more of the groups of instructions that satisfy the one or more fusion rules;
    analyzing a maximal length data dependence chain in the instruction stream by analyzing every node in a dependence graph in a selected window of instructions, wherein a length of the maximal length data dependence chain is based on a sum of a weighted dependence arc and wherein each weight is equal to an instruction runtime latency of a source instruction; and preventing fusion of an instruction group based on the maximal length data dependence chain, wherein the fusion is prevented if a maximal length leading to an instruction x is less than a maximal length leading to an instruction y in a corresponding instruction window and a maximal length originating from the instruction x in the corresponding instruction window is greater than a maximal length originating from the instruction y in the corresponding instruction window for a pair of instructions x, y.

18. An apparatus comprising:
a memory; and
at least one processor, coupled to said memory, and operative to perform operations comprising:
  obtaining an instruction stream;
  examining a window of instructions from the instruction stream and identifying one or more groups of instructions that satisfy one or more fusion rules;
  fusing one or more of the groups of instructions that satisfy the one or more fusion rules;
  analyzing a maximal length data dependence chain in the instruction stream by analyzing every node in a dependence graph in a selected window of instructions; and
  preventing fusion of an instruction group based on the maximal length data dependence chain;

where H(x) is a maximal length leading to instruction x in a corresponding instruction window, H(y) is a maximal length leading to instruction y in the corresponding instruction window, T(x) is a maximal length originating from the instruction x in the corresponding instruction window, T(y) is a maximal length originating from the instruction y in the corresponding instruction window, and where the fusion is prevented if (H(x)<H(y)) and (T(x)>T(y)) for a pair of instructions x, y.

19. The apparatus of claim 18, wherein the analyzing further comprises computing T(x) by conducting a breadth first traversal on the dependence graph for the instruction stream with instruction x as a root node, labeling each node in the dependence graph with a distance from the root node, and returning a maximum distance encountered among all reachable nodes in the dependence graph.

20. The apparatus of claim 18, wherein the analyzing further comprises computing H(x) by inverting all edges of an acyclic dependence graph for the instruction stream, conducting a breadth first traversal with instruction x as a root node, labeling each node in the acyclic dependence graph with a distance from the root node, and returning a maximum distance encountered among all reachable nodes in the acyclic dependence graph at an end of the breadth first traversal.

* * * * *